United States Patent
Belz et al.

(10) Patent No.: US 8,629,798 B2
(45) Date of Patent: Jan. 14, 2014

(54) PROGRAMMING A UNIVERSAL REMOTE CONTROL VIA DIRECT INTERACTION WITH AN ORIGINAL REMOTE CONTROL

(75) Inventors: Steven M. Belz, Cedar Park, TX (US); James Pratt, Round Rock, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 710 days.

(21) Appl. No.: 12/617,486

(22) Filed: Nov. 12, 2009

(65) Prior Publication Data

US 2011/0109490 A1  May 12, 2011

(51) Int. Cl.
H04L 17/02 (2006.01)

(52) U.S. Cl.
USPC ..... 341/176; 341/175; 340/12.22; 340/12.23; 340/12.25

(58) Field of Classification Search
USPC ........ 341/75, 76, 175, 176; 340/12.22, 12.23, 340/4.31, 12.25, 12.26, 12.51, 12.54, 340/825.22, 825.69, 825.72
See application file for complete search history.

(56) References Cited

U.S. PATENT DOCUMENTS

| | | | |
|---|---|---|---|
| 6,225,938 B1 * | 5/2001 | Hayes et al. | 341/176 |
| 6,640,144 B1 | 10/2003 | Huang et al. | |
| 6,650,248 B1 * | 11/2003 | O'Donnell et al. | 340/12.28 |
| 6,690,392 B1 * | 2/2004 | Wugoski | 715/744 |
| 6,956,496 B1 | 10/2005 | Herz | |
| 7,046,161 B2 * | 5/2006 | Hayes | 340/12.25 |
| 7,131,058 B1 | 10/2006 | Lapstun et al. | |
| 7,218,243 B2 | 5/2007 | Hayes et al. | |
| 7,224,903 B2 | 5/2007 | Colmenarez et al. | |
| 7,586,398 B2 | 9/2009 | Huang et al. | |
| 7,653,212 B2 * | 1/2010 | Haughawout et al. | 382/100 |
| 7,760,907 B2 * | 7/2010 | Haughawout et al. | 382/100 |
| 7,949,305 B2 | 5/2011 | Sullivan et al. | |
| 8,094,880 B2 * | 1/2012 | Haughawout et al. | 382/100 |
| 2003/0163542 A1 | 8/2003 | Bulthuis et al. | |
| 2004/0070491 A1 | 4/2004 | Huang et al. | |
| 2007/0037522 A1 * | 2/2007 | Liu et al. | 455/68 |
| 2007/0296552 A1 * | 12/2007 | Huang et al. | 340/10.5 |
| 2008/0261514 A1 | 10/2008 | Pratt et al. | |
| 2009/0021651 A1 | 1/2009 | Pratt et al. | |
| 2009/0031375 A1 | 1/2009 | Sullivan et al. | |
| 2009/0067591 A1 | 3/2009 | Belz et al. | |
| 2009/0070696 A1 | 3/2009 | Belz et al. | |
| 2009/0119181 A1 | 5/2009 | Pratt et al. | |
| 2009/0125971 A1 | 5/2009 | Belz et al. | |
| 2009/0157473 A1 | 6/2009 | Belz et al. | |
| 2009/0158373 A1 | 6/2009 | Belz et al. | |
| 2009/0180377 A1 | 7/2009 | Sullivan et al. | |
| 2009/0187955 A1 | 7/2009 | Sullivan et al. | |
| 2009/0237287 A1 | 9/2009 | D'Hoore et al. | |
| 2009/0245494 A1 | 10/2009 | Sullivan et al. | |

(Continued)

Primary Examiner — Linh Nguyen
(74) Attorney, Agent, or Firm — Jackson Walker L.L.P.

(57) ABSTRACT

A method and system for programming a universal remote control (URC) to operate with a remote-controlled device is disclosed. A user may be instructed to operate a control element of an original remote control (ORC) of the remote-controlled device. The ORC may be operated directly with the URC, which may so receive a programming code from the ORC. The programming code may be used by the URC to determine an identity of the remote-controlled device and/or the ORC. Based on the identity, the URC may obtain corresponding programming codes for the remote-controlled device. The URC may be configured to use at least one of the programming codes to remotely control the remote-controlled device.

19 Claims, 6 Drawing Sheets

(56) References Cited

U.S. PATENT DOCUMENTS

| | | |
|---|---|---|
| 2009/0288115 A1 | 11/2009 | Belz et al. |
| 2009/0312059 A1 | 12/2009 | Pratt et al. |
| 2009/0319607 A1 | 12/2009 | Belz et al. |
| 2010/0015999 A1 | 1/2010 | Belz et al. |
| 2010/0039214 A1 | 2/2010 | Pratt et al. |
| 2010/0039282 A1* | 2/2010 | Hostage et al. .......... 340/825.22 |
| 2010/0039392 A1 | 2/2010 | Pratt et al. |
| 2010/0039393 A1 | 2/2010 | Pratt et al. |
| 2010/0042827 A1 | 2/2010 | Pratt et al. |
| 2010/0050270 A1 | 2/2010 | Pratt et al. |
| 2010/0069012 A1 | 3/2010 | Sullivan et al. |
| 2010/0082712 A1 | 4/2010 | Pratt et al. |
| 2010/0085209 A1 | 4/2010 | Teuling et al. |
| 2010/0088149 A1 | 4/2010 | Sullivan et al. |
| 2010/0104024 A1 | 4/2010 | Sullivan et al. |
| 2010/0113160 A1 | 5/2010 | Belz et al. |
| 2010/0115592 A1 | 5/2010 | Belz et al. |
| 2010/0115607 A1 | 5/2010 | Pratt et al. |
| 2010/0118748 A1 | 5/2010 | Pratt et al. |
| 2010/0119051 A1 | 5/2010 | Belz et al. |
| 2010/0121744 A1 | 5/2010 | Belz et al. |
| 2010/0122306 A1 | 5/2010 | Pratt et al. |
| 2010/0124905 A1 | 5/2010 | Pratt et al. |
| 2010/0134338 A1 | 6/2010 | Belz et al. |
| 2010/0138499 A1 | 6/2010 | Belz et al. |
| 2010/0138876 A1 | 6/2010 | Sullivan et al. |
| 2010/0144368 A1 | 6/2010 | Sullivan et al. |
| 2010/0149982 A1 | 6/2010 | Pratt et al. |
| 2010/0150327 A1 | 6/2010 | Belz et al. |
| 2010/0153764 A1 | 6/2010 | Pratt et al. |
| 2010/0153995 A1 | 6/2010 | Belz et al. |
| 2010/0158533 A1 | 6/2010 | Belz et al. |
| 2010/0161801 A1 | 6/2010 | Belz et al. |
| 2010/0162331 A1 | 6/2010 | Belz et al. |
| 2010/0174572 A1 | 7/2010 | Joseph et al. |
| 2010/0235872 A1 | 9/2010 | Sullivan et al. |
| 2010/0275237 A1 | 10/2010 | Pratt et al. |
| 2010/0289685 A1 | 11/2010 | Pratt et al. |
| 2010/0289954 A1 | 11/2010 | Sullivan et al. |
| 2010/0302057 A1* | 12/2010 | Pratt et al. ................ 340/825.69 |
| 2010/0302058 A1 | 12/2010 | Belz et al. |
| 2011/0003587 A1 | 1/2011 | Belz et al. |
| 2011/0010745 A1 | 1/2011 | Belz et al. |
| 2011/0012710 A1 | 1/2011 | Sullivan et al. |
| 2011/0029887 A1 | 2/2011 | Pearson et al. |
| 2011/0037574 A1* | 2/2011 | Pratt et al. .................. 340/10.51 |
| 2011/0037611 A1 | 2/2011 | Van Vleck et al. |
| 2011/0037635 A1 | 2/2011 | Van Vleck et al. |
| 2011/0037637 A1 | 2/2011 | Van Vleck et al. |
| 2011/0090085 A1 | 4/2011 | Belz et al. |
| 2011/0093876 A1 | 4/2011 | Belz et al. |
| 2011/0093908 A1 | 4/2011 | Van Vleck et al. |
| 2011/0095873 A1 | 4/2011 | Pratt et al. |
| 2011/0109444 A1 | 5/2011 | Edwards et al. |
| 2011/0113459 A1 | 5/2011 | Crowe et al. |
| 2011/0114716 A1 | 5/2011 | Pratt |
| 2011/0115664 A1 | 5/2011 | Belz et al. |
| 2011/0131605 A1 | 6/2011 | Pratt et al. |
| 2011/0159861 A1 | 6/2011 | Pratt et al. |
| 2011/0161423 A1 | 6/2011 | Pratt et al. |

* cited by examiner

PROGRAMMING A UNIVERSAL REMOTE CONTROL VIA DIRECT INTERACTION WITH AN ORIGINAL REMOTE CONTROL

BACKGROUND

1. Field of the Disclosure

The present disclosure relates to remote control devices and, more particularly, to programming universal remote control devices.

2. Description of the Related Art

Remote control devices provide convenient operation of equipment from a distance. Many consumer electronic devices are equipped with remote control features. Universal remote control devices may be configured to control different pieces of equipment.

DESCRIPTION OF THE EXEMPLARY EMBODIMENTS

Figure 1:
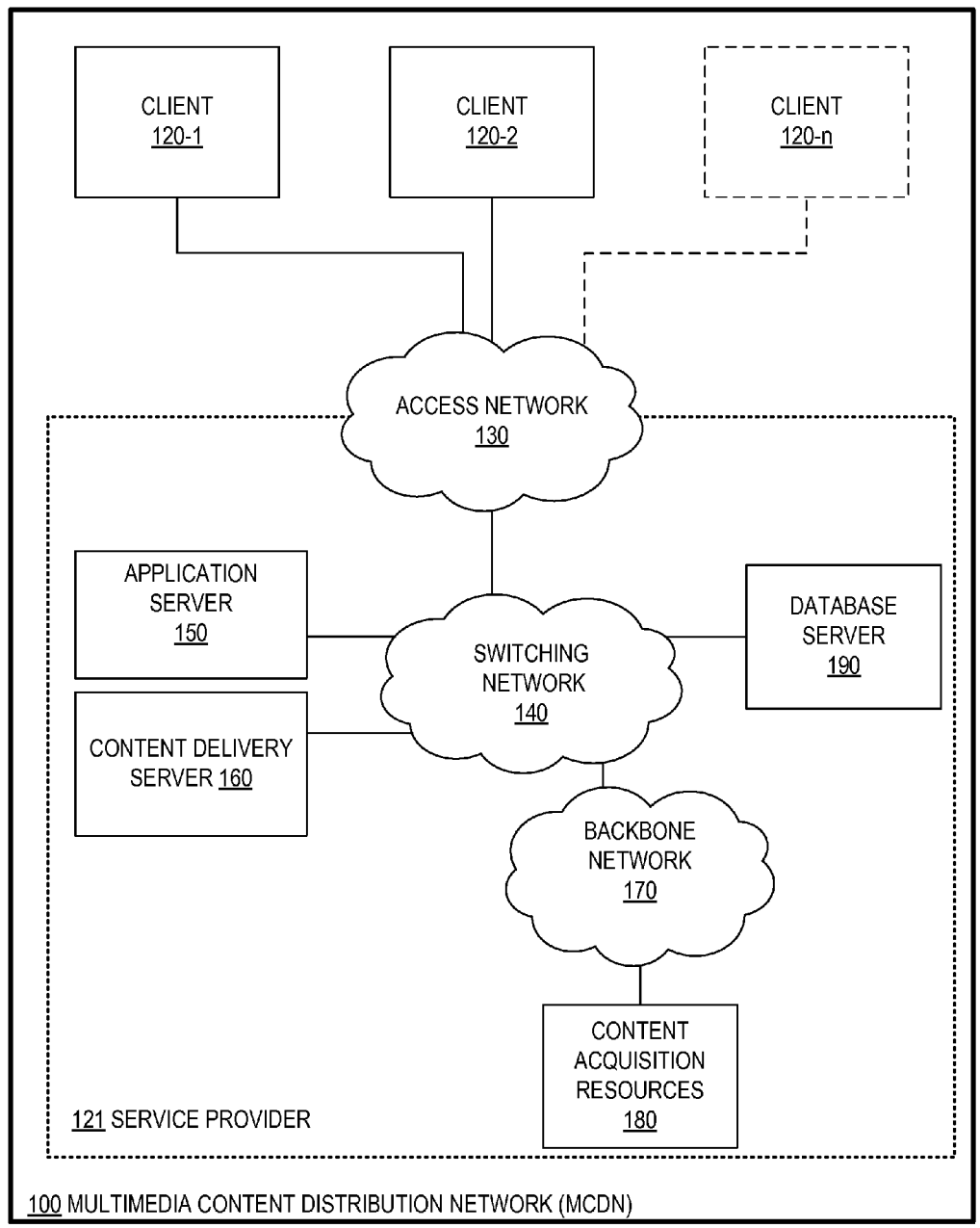
FIG. 1 is a block diagram of selected elements of an embodiment of a multimedia distribution network.

In one aspect, a disclosed method for configuring a universal remote control (URC) includes receiving input from the user for initiating programming of the URC, and receiving a first code from the original remote control (ORC). The code may be received after the user operates a first control element of an ORC corresponding to a remote-controlled device. The method may also include retrieving programming codes for either the identified ORC or the identified remote-controlled device, and configuring the URC to operate the remote-controlled device by programming the URC to use at least one of the programming codes.

In specific embodiments, the method operation of identifying either the ORC or the corresponding remote-controlled device may include receiving, from a database, information indicating a list of remote-controlled devices that are responsive to the first code. The remote-controlled device may be uniquely identified using the list. The received information may indicate more than one identified remote-controlled device. After the user operates a second control element of the ORC, the method may include receiving a second code from the ORC, and receiving, from the database, information indicating identified remote-controlled devices that are responsive to both the first code and the second code.

In certain instances, the method operation of retrieving the programming codes may further include retrieving the programming codes. The method may further include displaying an identity of either the ORC or the corresponding remote-controlled device to the user, and receiving a confirmation from the user acknowledging the identity. The method may still further include displaying a prompt to a user to operate the first control element.

In particular embodiments, the method also includes displaying a confirmation indicating that the URC has been successfully configured with at least one of the programming codes. The URC may be programmed using a wireless communication link. The URC may be configured to operate with consumer-premises equipment associated with a multimedia content distribution network. The method may further include sending a command to control the remote-controlled device, wherein the command is associated with at least one of the programming codes.

In a further aspect, a disclosed URC for use within a client configuration of a multimedia content distribution network (MCDN) includes a processor, a remote control interface, and memory media accessible to the processor, including instructions executable by the processor. The processor executable instructions may be executable to prompt a user to operate a first control element of an ORC corresponding to a remote-controlled device, and receive a first code from the ORC at the remote control interface, after the user operates the first control element. In response to querying a database with the first code, the processor executable instructions may be executable to retrieve programming codes for the remote-controlled device, and program the URC to use at least one of the programming codes.

In some embodiments, the URC may further include processor executable instructions to initiate programming of the URC in response to user input prior to executing said prompt. The URC may further include processor executable instructions executable to prompt the user to operate a second control element of the ORC, and after the user operates the second control element, receive a second code from the ORC at the remote control interface. The processor executable instructions may also be executable to, in response to querying the database with the first code and the second code, retrieve programming codes for the remote-controlled device.

In given embodiments, the processor executable instructions to prompt the user to operate the second control element may be performed in response to receiving an indication of more than one remote-controlled device that corresponds to the first code. The URC may further include processor executable instructions executable to send, via the remote control interface, a command to control the remote-controlled device, wherein the command is associated with at least one of the programming codes. The processor executable instructions to prompt the user may include instructions to prompt the user to operate the ORC directed to the remote control interface of the URC. In particular embodiments, the memory media may further include the database.

In yet another aspect, a disclosed computer-readable memory media includes executable instructions for configuring a URC. The instructions may be executable to transition the URC to a programming state in response to user input, and, in response to a user operating a first control element of an ORC associated with a remote-controlled device, receive a first code from the ORC. The instructions may further be executable to identify the remote-controlled device or the ORC using the first code, and retrieve programming codes for the identified remote-controlled device or the identified ORC from a database.

In particular embodiments, the memory media further includes instructions executable to program the URC to operate the remote-controlled device using at least one of the programming codes. The memory media may further include instructions executable to send, from the URC, a command to control the remote-controlled device, wherein the command is associated with at least one of the programming codes. The instructions to identify the remote-controlled device or the ORC using the first code may further include instructions executable to send a request to the database to identify the remote-controlled device or the ORC, the request including the first code. In response to sending the request, the instructions may be further executable to receive an identity of the remote-controlled device or the ORC.

In certain embodiments, the instructions to identify the remote-controlled device using the first code may include instructions executable to respond to the user operating a second control element of the ORC by receiving a second code from the ORC, and send a request to the database to identify the remote-controlled device, the request including the first code and the second code. In response to sending the request, the instructions may also be executable to receive an identity of the remote-controlled device or the ORC.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, for example, widget 12-1 refers to an instance of a widget class, which may be referred to collectively as widgets 12 and any one of which may be referred to generically as a widget 12.

Turning now to the drawings, FIG. 1 is a block diagram illustrating selected elements of an embodiment of MCDN 100. Although multimedia content is not limited to TV, video on demand (VOD), or pay-per-view (PPV) programs, the depicted embodiments of MCDN 100 and its capabilities are primarily described herein with reference to these types of multimedia content, which are interchangeably referred to herein as "multimedia content", "multimedia content programs", "multimedia programs" or, simply, "programs."

The elements of MCDN 100 illustrated in FIG. 1 depict network embodiments with functionality for delivering multimedia content to a set of one or more subscribers. It is noted that different embodiments of MCDN 100 may include additional elements or systems (not shown in FIG. 1 for clarity) as desired for additional functionality, such as data processing systems for billing, content management, customer support, operational support, or other business applications.

As depicted in FIG. 1, MCDN 100 includes one or more clients 120 and a service provider 121. Each client 120 may represent a different subscriber of MCDN 100. In FIG. 1, a plurality of n clients 120 is depicted as client 120-1, client 120-2 to client 120-n, where n may be a large number. Service provider 121 as depicted in FIG. 1 encompasses resources to acquire, process, and deliver programs to clients 120 via access network 130. Such elements in FIG. 1 of service provider 121 include content acquisition resources 180 connected to switching network 140 via backbone network 170, as well as application server 150, database server 190, and content delivery server 160, also shown connected to switching network 140.

Access network 130 demarcates clients 120 and service provider 121, and provides at least one connection path between clients 120 and service provider 121. In some embodiments, access network 130 is an Internet protocol (IP) compliant network. In some embodiments, access network 130 is, at least in part, a coaxial cable network. It is noted that in some embodiments of MCDN 100, access network 130 is owned and/or operated by service provider 121. In other embodiments, a third party may own and/or operate at least a portion of access network 130.

In IP-compliant embodiments of access network 130, access network 130 may include a physical layer of unshielded twisted pair cables, fiber optic cables, or a combination thereof. MCDN 100 may include digital subscriber line (DSL) compliant twisted pair connections between clients 120 and a node (not depicted) in access network 130 while fiber, cable or another broadband medium connects service provider resources to the node. In other embodiments, the broadband cable may extend all the way to clients 120.

As depicted in FIG. 1, switching network 140 provides connectivity for service provider 121, and may be housed in a central office or other facility of service provider 121. Switching network 140 may provide firewall and routing functions to demarcate access network 130 from the resources of service provider 121. In embodiments that employ DSL compliant connections, switching network 140 may include elements of a DSL Access Multiplexer (DSLAM) that multiplexes many subscriber DSLs to backbone network 170.

In FIG. 1, backbone network 170 represents a private network including, as an example, a fiber based network to accommodate high data transfer rates. Content acquisition resources 180 as depicted in FIG. 1 encompass the acquisition of various types of content including broadcast content, other "live" content including national content feeds, and VOD content.

Thus, the content provided by service provider 121 encompasses multimedia content that is scheduled in advance for viewing by clients 120 via access network 130. Such multimedia content, also referred to herein as "scheduled programming," may be selected using an electronic programming guide (EPG), such as EPG 316 described below with respect to FIG. 3. Accordingly, a user of MCDN 100 may be able to browse scheduled programming well in advance of the broadcast date and time. Some scheduled programs may be "regularly" scheduled programs, which recur at regular intervals or at the same periodic date and time (i.e., daily, weekly, monthly, etc.). Programs which are broadcast at short notice or interrupt scheduled programs are referred to herein as "unscheduled programming."

Acquired content is provided to content delivery server 160 via backbone network 170 and switching network 140. Content may be delivered from content delivery server 160 to clients 120 via switching network 140 and access network 130. Content may be compressed, encrypted, modulated, demodulated, and otherwise encoded or processed at content acquisition resources 180, content delivery server 160, or both. Although FIG. 1 depicts a single element encompassing acquisition of all content, different types of content may be acquired via different types of acquisition resources. Similarly, although FIG. 1 depicts a single content delivery server 160, different types of content may be delivered by different servers. Moreover, embodiments of MCDN 100 may include content acquisition resources in regional offices that are connected to switching network 140.

Although service provider 121 is depicted in FIG. 1 as having switching network 140 to which content acquisition resources 180, content delivery server 160, and application server 150 are connected, other embodiments may employ different switching networks for each of these functional components and may include additional functional components (not depicted in FIG. 1) including, for example, operational subsystem support (OSS) resources.

FIG. 1 also illustrates application server 150 connected to switching network 140. As suggested by its name, application server 150 may host or otherwise implement one or more applications for MCDN 100. Application server 150 may be any data processing system with associated software that provides applications for clients or users. Application server 150 may provide services including multimedia content services, e.g., EPGs, digital video recording (DVR) services, VOD programs, PPV programs, IPTV portals, digital rights management (DRM) servers, navigation/middleware servers, conditional access systems (CAS), and remote diagnostics, as examples.

Applications provided by application server 150 may be downloaded and hosted on other network resources including, for example, content delivery server 160, switching network 140, and/or on clients 120. Application server 150 is configured with a processor and storage media (not shown in FIG. 1) and is enabled to execute processor instructions, such as those included within a software application. As depicted in FIG. 1, application server 150 may be configured to include various applications (not shown in FIG. 1).

Further depicted in FIG. 1 is database server 190, which provides hardware and software resources for data warehousing. Database server 190 may communicate with other elements of the resources of service provider 121, such as application server 150 or content delivery server 160, in order to store and provide access to large volumes of data, information, or multimedia content. In some embodiments, database server 190 includes a data warehousing application, accessible via switching network 140, that can be used to record and access structured data, such as program or channel metadata for clients 120. Database server 190 may also store device information, such as identifiers for client 120, model identifiers for remote control devices, and programming codes for URCs.

Figure 2:
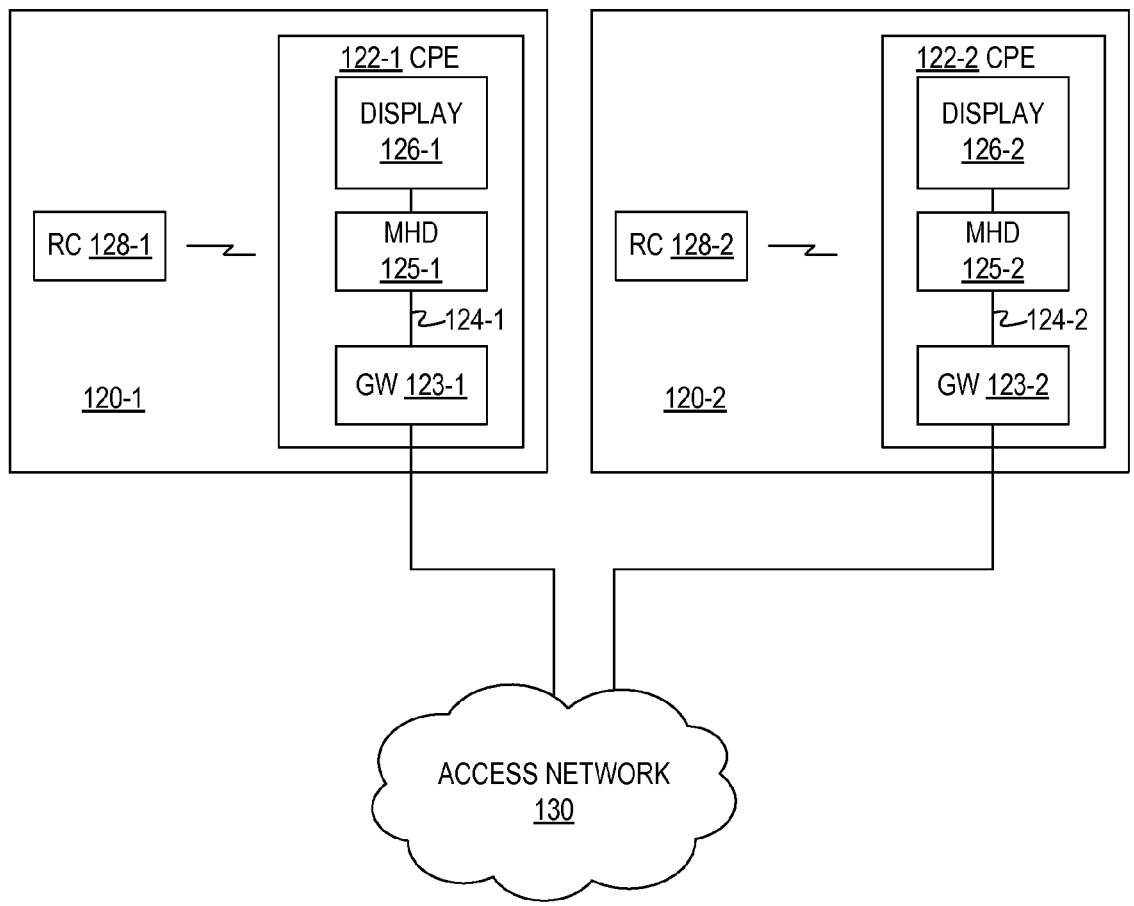
FIG. 2 is a block diagram of selected elements of an embodiment of a multimedia distribution network.

Turning now to FIG. 2, clients 120 are shown in additional detail with respect to access network 130. Clients 120 may include network appliances collectively referred to herein as client premises equipment (CPE) 122. In the depicted embodiment, CPE 122 includes the following devices: gateway (GW) 123, multimedia handling device (MHD) 125, and display device 126. Any combination of GW 123, MHD 125, and display device 126 may be integrated into a single physical device. Thus, for example, CPE 122 might include a single physical device that integrates GW 123, MHD 125, and display device 126. As another example, MHD 125 may be integrated into display device 126, while GW 123 is housed within a physically separate device.

In FIG. 2, GW 123 provides connectivity for client 120 to access network 130. GW 123 provides an interface and conversion function between access network 130 and client-side local area network (LAN) 124. GW 123 may include elements of a conventional DSL or cable modem. GW 123, in some embodiments, may further include routing functionality for routing multimedia content, conventional data content, or a combination of both in compliance with IP or another network layer protocol. In some embodiments, LAN 124 may encompass or represent an IEEE 802.3 (Ethernet) LAN, an IEEE 802.11-type (WiFi) LAN, or a combination thereof. GW 123 may still further include WiFi or another type of wireless access point to extend LAN 124 to wireless-capable devices in proximity to GW 123. GW 123 may also provide a firewall (not depicted) between clients 120 and access network 130.

Clients 120 as depicted in FIG. 2 further include a display device or, more simply, a display 126. Display 126 may be implemented as a TV, a liquid crystal display screen, a computer monitor, or the like. Display 126 may comply with a display standard such as National Television System Committee (NTSC), Phase Alternating Line (PAL), or another suitable standard. Display 126 may include one or more integrated speakers to play audio content.

Clients 120 are further shown with their respective remote control 128, which is configured to control the operation of MHD 125 by means of a user interface (not shown in FIG. 2) displayed on display 126. Remote control 128 of client 120 is operable to communicate requests or commands wirelessly to MHD 125 using infrared (IR) or radio frequency (RF) signals. MHDs 125 may also receive requests or commands via buttons (not depicted) located on side panels of MHDs 125.

In some embodiments, remote control 128 may represent a URC device that is configured to control multiple pieces of equipment. When the equipment controlled by the URC device changes, the URC device may be reprogrammed, for example, to add a new device. The URC device may be programmed using a local transceiver (see FIG. 3) coupled to CPE 122. In some cases, CPE 122 may receive network commands to reprogram the URC device, as will be described in detail below.

MHD 125 is enabled and configured to process incoming multimedia signals to produce audio and visual signals suitable for delivery to display 126 and any optional external speakers (not depicted in FIG. 2). Incoming multimedia signals received by MHD 125 may be compressed and/or encrypted, digital or analog, packetized for delivery over packet switched embodiments of access network 130 or modulated for delivery over cable-based access networks. In some embodiments, MHD 125 may be implemented as a stand-alone set top box suitable for use in a coaxial or IP-based multimedia content delivery network.

Figure 3:
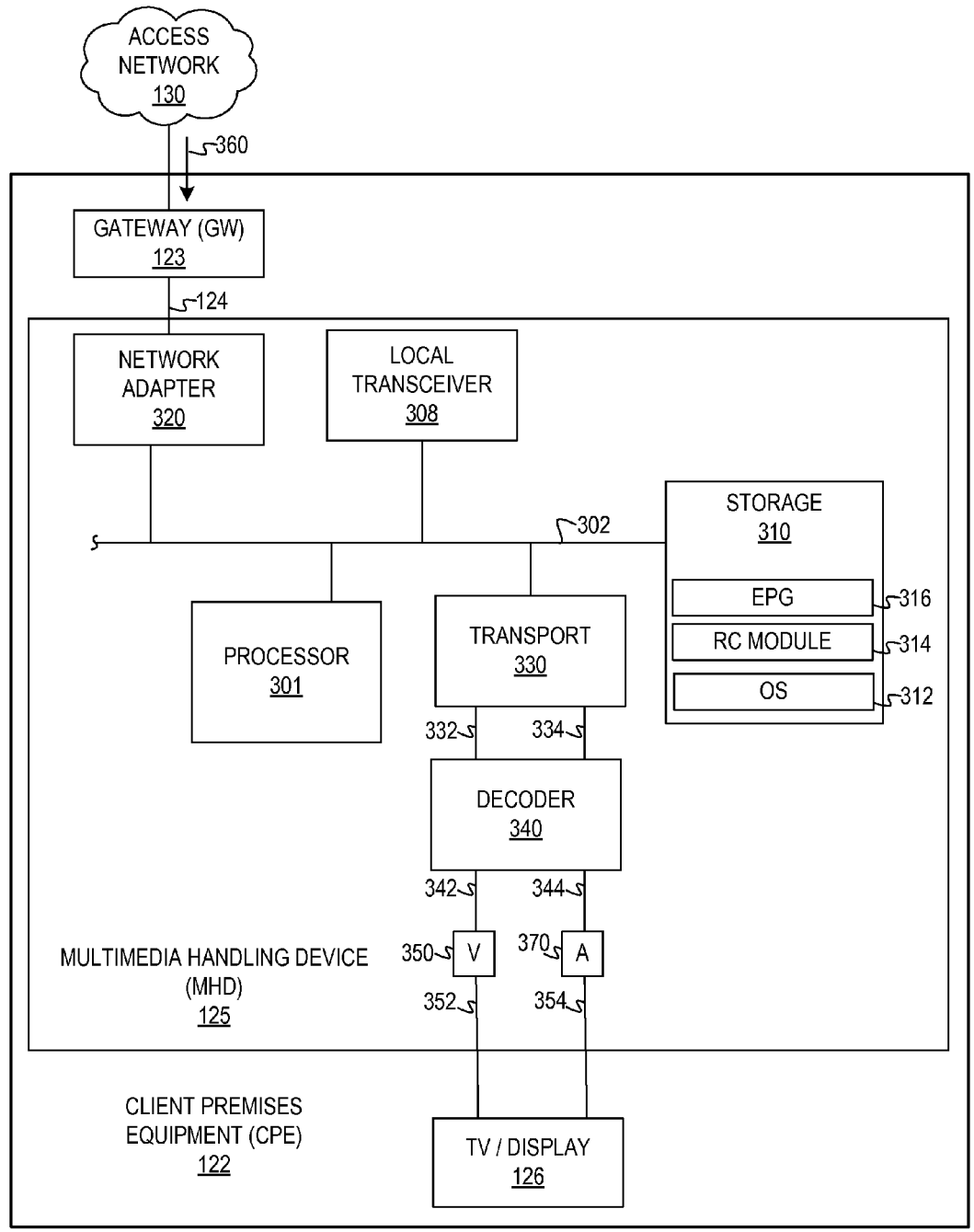
FIG. 3 is a block diagram of selected elements of an embodiment of a multimedia handling device.

Referring now to FIG. 3, a block diagram illustrating selected elements of an embodiment of MHD 125 is presented. In FIG. 3, MHD 125 is shown as a functional component of CPE 122 along with GW 123 and display 126, independent of any physical implementation, as discussed above with respect to FIG. 2. In particular, it is noted that CPE 122 may be any combination of GW 123, MHD 125 and display 126.

In the embodiment depicted in FIG. 3, MHD 125 includes processor 301 coupled via shared bus 302 to storage media collectively identified as storage 310. MHD 125, as depicted in FIG. 3, further includes network adapter 320 that interfaces MHD 125 to LAN 124 and through which MHD 125 receives multimedia content 360. GW 123 is shown providing a bridge between access network 130 and LAN 124, and receiving multimedia content 360 from access network 130.

In embodiments suitable for use in IP-based content delivery networks, MHD 125, as depicted in FIG. 3, may include transport unit 330 that assembles the payloads from a sequence or set of network packets into a stream of multimedia content. In coaxial-based access networks, content may be delivered as a stream that is not packet-based and it may not be necessary in these embodiments to include transport unit 330. In a coaxial implementation, however, clients 120 may require tuning resources (not explicitly depicted in FIG. 3) to "filter" desired content from other content that is delivered over the coaxial medium simultaneously and these tuners may be provided in MHDs 125. The stream of multimedia content received by transport unit 330 may include audio information and video information and transport unit 330 may parse or segregate the two to generate video stream 332 and audio stream 334 as shown.

Video and audio streams 332 and 334, as output from transport unit 330, may include audio or video information that is compressed, encrypted, or both. A decoder unit 340 is shown as receiving video and audio streams 332 and 334 and generating native format video and audio streams 342 and 344. Decoder 340 may employ any of various widely distributed video decoding algorithms including any of the Motion Pictures Expert Group (MPEG) standards, or Windows Media Video (WMV) standards including WMV 9, which has been standardized as Video Codec-1 (VC-1) by the Society of Motion Picture and Television Engineers. Similarly decoder 340 may employ any of various audio decoding algorithms including Dolby® Digital, Digital Theatre System (DTS) Coherent Acoustics, and Windows Media Audio (WMA).

The native format video and audio streams 342 and 344 as shown in FIG. 3 may be processed by encoders/digital-to-analog converters (encoders/DACs) 350 and 370 respectively to produce analog video and audio signals 352 and 354 in a format compliant with display 126, which itself may not be a part of MHD 125. Display 126 may comply with NTSC, PAL or any other suitable television standard.

Storage 310 encompasses persistent and volatile media, fixed and removable media, and magnetic and semiconductor media. Storage 310 is operable to store instructions, data, or both. Storage 310 as shown may include sets or sequences of instructions, namely, an operating system 312, a remote control application program identified as RC module 314, and EPG 316. Operating system 312 may be a UNIX or UNIX-like operating system, a Windows® family operating system, or another suitable operating system. In some embodiments, storage 310 is configured to store and execute instructions provided as services to client 120 by application server 150, as mentioned previously.

EPG 316 represents a guide to the multimedia content provided to client 120 via MCDN 100, and may be shown to the user as an element of the user interface. The user interface may include a plurality of menu items arranged according to one or more menu layouts, which enable a user to operate MHD 125. The user may operate the user interface, including EPG 316, using remote control 128 (see FIG. 2) in conjunction with RC module 314.

Local transceiver 308 represents an interface of MHD 125 for communicating with external devices, such as remote control 128, or another URC device. Local transceiver 308 may provide a mechanical interface for coupling to an external device, such as a plug, socket, or other proximal adapter. In some cases, local transceiver 308 is a wireless transceiver, configured to send and receive IR or RF or other signals. A URC device configured to operate with CPE 122, such as RC 128 (see FIG. 2) or URC 410 (see FIG. 4), may communicate with CPE 122 using local transceiver 308. Local transceiver 308 may be accessed by RC module 314 for providing remote control functionality.

Figure 4:
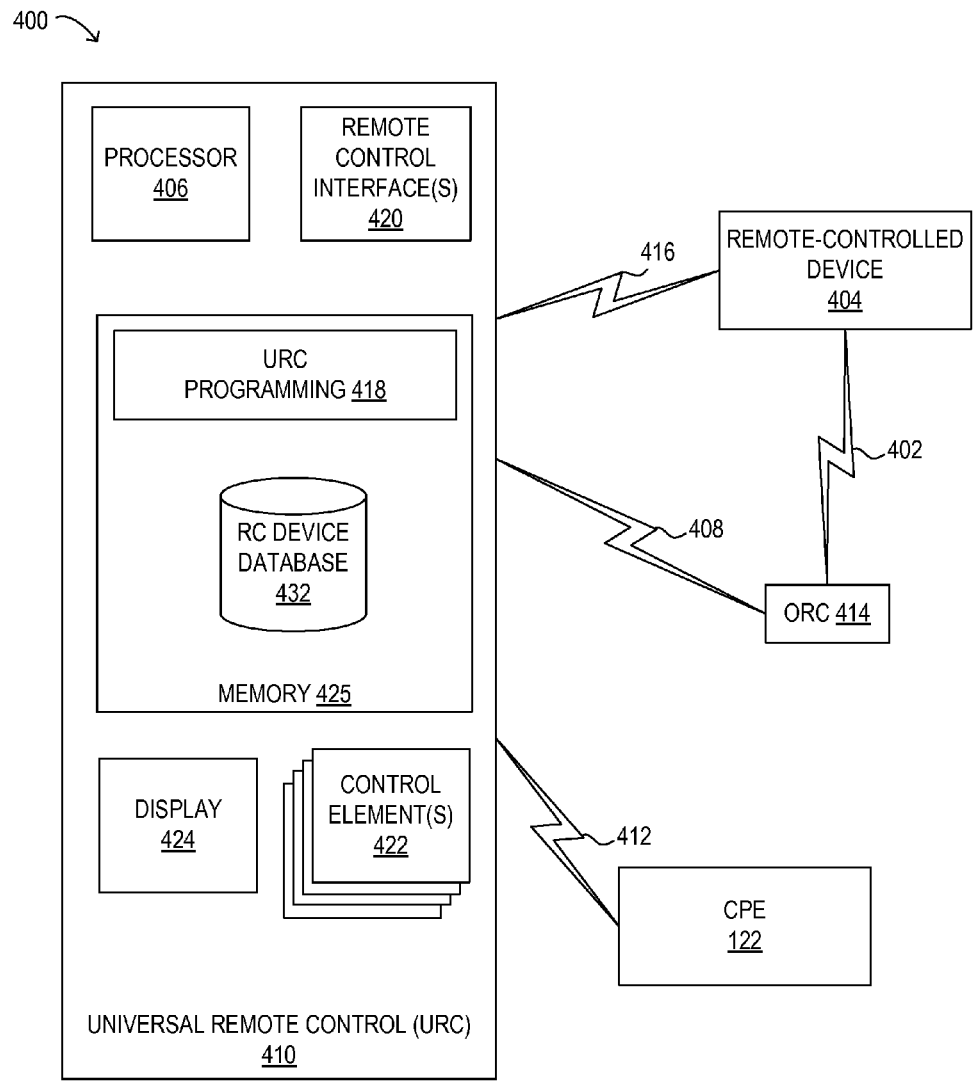
FIG. 4 a block diagram of selected elements of an embodiment of a universal remote control system.

Turning now to FIG. 4, a block diagram of selected elements of an embodiment of URC system 400 is depicted. In URC system 400, ORC 414, URC 410, and CPE 122 may be in proximity to remote-controlled device 404, for example at a location of an MCDN client 120. URC system 400 illustrates devices, interfaces and information that may be processed to program URC 410 to control remote-controlled device 404. The reconfiguring, or reprogramming, of URC 410 may be complex, error prone, or time-consuming for a user. URC system 400 is a platform that may allow a user to reprogram URC 410 using ORC 414. It is noted that in FIG. 4, communication links 402, 408, 412, and 416 may be wireless or mechanically connected interfaces. It is further noted that like numbered elements in FIG. 4 represent components discussed above with respect to FIGS. 1-3.

In FIG. 4, remote-controlled device 404 refers to a piece of equipment that is introduced for use with or near CPE 122. In some embodiments, remote-controlled device 404 may be controllable by remote control, and may be suitable for control by URC 410. Remote-controlled device 404 may also represent an existing instrument or device that is in use, but not yet controllable using URC 410, because URC 410 may not yet be configured to control remote-controlled device 404. Remote-controlled device 404 may further include one or more local transceivers or interfaces (not explicitly shown in FIG. 4) for communicating with remote controls, or for control by another piece of equipment, as will be described below.

ORC 414 may be a remote control that is dedicated for operation with remote-controlled device 404, for example, via communication link 402. That is, ORC 414 may represent original equipment provided with remote-controlled device 404, such that remote-controlled device 404 and ORC 414 may communicate via communication link 402 as a stand-alone unit. ORC 414 may be configured to use programming codes, or coded instructions, that are specific to remote-controlled device 404. ORC 414 may store programming codes for remote-controlled device 404 in a local memory (not shown in FIG. 4). ORC 414 may further be specific to a device-type (i.e., model, configuration, etc.) corresponding to remote-controlled device 404, such that ORC 414 may be operable with any manufactured instance of a particular device model, represented by remote-controlled device 404. Accordingly, by determining an identity of ORC 414, an identity of remote-controlled device 404 may correspondingly be determined. Furthermore, ORC 414 and/or remote-controlled device 404 may be identifiable by programming codes or other information stored in ORC 414.

In FIG. 4, URC 410 may communicate with CPE 122 via communication link 412. Communication link 412 may be used to receive remote control commands (i.e., in the form of codes or instructions) from URC 410. In certain embodiments, communication link 412 may be used to reprogram (i.e., reconfigure) URC 410 to send different commands or to control different equipment. In some implementations, remote-controlled device 404 may be coupled to CPE 122. The coupling (not shown in FIG. 4) to CPE 122 may be subordinate in nature, such that remote-controlled device 404 may be controlled by CPE 122 in response to commands or signals received by local transceiver 308 (see FIG. 3).

As shown in FIG. 4, ORC 414 may communicate with URC 410 via communication link 408. Communication link 408 may be used by URC 410 to receive programming codes from ORC 414 that are specific to remote-controlled device 404. As will be described in detail below, URC 410 may prompt a user to activate a control element of ORC 414 while operating ORC 414 with URC 410, in order to identify remote-controlled device 404. URC 410 may perform communications via communication link 408 using remote control interface(s) 420.

In FIG. 4, after URC 410 has been configured with at least some programming codes corresponding to remote-controlled device 404, URC 410 may communicate via communication link 416 with remote-controlled device 404. That is, URC 410 may emulate at least some functionality using communication link 416 that ORC 414 is capable of using communication link 402. From the perspective of remote-controlled device 404, communication links 402 and 416 may appear identical or indistinguishable. In other words, remote-controlled device 404 may not be aware that URC 410 is emulating ORC 414, and may respond to communication links 402 or 416 in an identical manner.

As shown in FIG. 4, URC 410, which may be a hand-held and manually operated device, includes numerous elements, and may include additional elements (not shown in FIG. 4) in various embodiments. In certain implementations, URC 410 may be an embodiment of remote control 128 (see FIG. 2). URC 410 may be capable of controlling multiple pieces of equipment, such as remote-controlled device 404 and/or CPE 122. Accordingly, URC 410 may be configured or reconfigured to control a given set of remote-controlled devices, for example, by adding new remote-controlled devices to the set, and/or by removing existing remote-controlled devices from the set. URC 410 may store the set of remote control devices for which it is configured to control in memory 425.

URC 410 is shown further including processor 406, remote control interface(s) 420, memory 425, and control element(s) 422. Memory 425 is depicted in FIG. 4 including URC programming 418 and RC device database 432. Accordingly, URC 410 may comprise elements configured to function as an embodiment of an electronic device capable of executing program instructions. URC 410 may further include at least one shared bus (not shown in FIG. 4) for interconnectivity among internal elements, such as those depicted in FIG. 4.

Processor 406 may represent at least one processing unit and may further include internal memory, such as a cache for storing processor executable instructions. In certain embodiments, processor 406 serves as a main controller for URC 410. Processor 406 may access other elements in URC 410 and may provide for internal communications between elements in URC 410.

In FIG. 4, remote control interface(s) 420 may represent a communications transceiver providing an interface for any of a number of communication links. In certain embodiments, remote control interface(s) 420 supports wireless communication links, such as IR, RF, and audio, among others. Remote control interface(s) 420 may further support mechanically connected communication links to remote controls, such as galvanically wired connections, and may accordingly include a physical adapter or receptacle for receiving such connections. In one embodiment, remote control interface(s) 420 transforms an instruction for operating remote-controlled device 404 into a signal sent via communication link 416. It is noted that remote control interface(s) 420 may be a bidirectional interface, such that responses, such as commands, information, or acknowledgements, may be received from remote-controlled device 404 via communication link 416. In one embodiment, a message may be sent to remote-controlled device 404 and an acknowledgement of the message may be received from remote-controlled device 404. The message may include command data, as will be described below. Remote control interface(s) 420 may further be configured to receive programming codes for configuring URC 410 to control a new remote-controlled device, such as remote-controlled device 404.

Also in FIG. 4, memory 425 encompasses persistent and volatile media, fixed and removable media, magnetic and semiconductor media, or a combination thereof. Memory 425 is operable to store instructions, data, or both. Memory 425 may represent URC memory immovably integrated into the URC, for example by soldering a semiconductor device to a circuit board of URC 410. Memory 425 as shown includes data, which may be in the form of sets or sequences of instructions, namely, URC programming 418. URC programming 418 may include processor executable instructions to configure URC 410 to control remote-controlled device 404, as described herein. Memory 425 may also include RC device database 432. RC device database 432 may include device information for a variety of different remote-controlled devices, which may be controllable by URC 410. The device information may include programming codes for specific remote-controlled devices. In some embodiments, RC device database 432 may include information for a majority of known remote-controlled devices that are available for purchase by consumers.

URC 410, as depicted in FIG. 4, includes control element(s) 422, representing a variety of input control elements integrated into URC 410. Control element(s) 422 may be buttons, sliders, switches or other types of electromechanical input devices. For example, control element(s) 422 may include power control elements for powering URC 410 on or off. Control element(s) 422 may additionally include control elements that generate remote control commands executable by remote-controlled device 404, such as, but not limited to, info, play, pause, guide, purchase, browse, etc. In certain embodiments, control element(s) 422 may include control elements associated with a remote control context (not shown in FIG. 4) executing on remote-controlled device 404. The remote control context may be in the form of a displayed menu structure that is responsive to control element(s) 422. In particular, control element(s) 422 may include functionality to select an activated item in the remote control context.

In certain embodiments, URC 410 may further include display element (not shown in FIG. 5), referred to as display 424, which may represent a display device implemented as a liquid crystal display screen, a computer monitor, a television, a touch screen device, or the like. Display 424 may comply with a display standard for the corresponding type of display. Standards for computer monitors include analog standards such as video graphics array (VGA), extended graphics array (XGA), etc., or digital standards such as digital visual interface (DVI) or high-definition multimedia interface (HDMI), among others. A television display may comply with standards such as National Television System Committee (NTSC), Phase Alternating Line (PAL), or another suitable standard.

In operation of URC system 400, as shown in FIG. 4, a user (not shown) may initiate a URC configuration request for configuring URC 410 to control remote-controlled device 404. The URC configuration request, which may be initiated by activating one of control element(s) 422, may cause URC 410 to transition to a programming mode or state. The programming mode may be a state in which URC 410 is receptive to input via remote control interface(s) 420. The user may then be prompted, for example, via display 424, to activate a control element of ORC 414 (not shown in FIG. 4), thereby causing a first input to be received by URC 410 at remote control interface(s) 420. The user may be prompted to operate ORC 414 via communication link 408, that is, directed to remote control interface(s) 420 of URC 410 without any participation by remote-controlled device 404. In other embodiments, URC 410 may 'listen' to ORC 414 communicating with remote-controlled device 404, such that communication link 408 may represent URC 410 'eavesdropping' (i.e., URC 410 receiving a signal transmitted over communication link 402).

Such actions may provide URC 410 with a programming code that can be used to identify remote-controlled device 404 and/or ORC 414. URC 410 may use the code to query RC device database 432 for at least one identity of remote-controlled device 404 and/or ORC 414. In certain embodiments, URC 410 may repeat the user prompt to obtain a first code and a second code (or additional codes, as desired). The first code and the second code may be used by URC 410 to query RC device database 432 to uniquely identify remote-controlled device 404 and/or ORC 414, or to further limit the possible identities of remote-controlled device 404 and/or ORC 414. This process may be repeated for a third and fourth prompt, etc., as desired.

In certain embodiments, URC 410 may then display, or otherwise send, at least one potential identity for remote-controlled device 404 and/or ORC 414 to the user. The user may then acknowledge and/or confirm the identity. Next, URC 410 may now use the identity to query RC device database 432 for additional programming codes and/or assignments of programming codes to control element(s) 422. URC programming 418 may display an indication of being ready to reprogram URC 410. URC programming 418 may then program URC 410 with at least some of the programming codes. In some cases, URC programming 418 may wait for user input before proceeding to configure URC 410. After URC 410 has been programmed, or reprogrammed, URC programming 418 may display an indication that URC 410 has been successfully configured to control remote-controlled device 404. Finally, URC programming 418 may send an acknowledgement to the user that URC 410 has been successfully configured for use with remote-controlled device 404 using communication link 416.

It is noted that URC 410 may maintain a list of remote-controlled devices that it is presently configured to control. URC 410 may display the list of configured remote-controlled devices to the user, for example, for selection to operate. URC 410 may further detect the presence of remote-controlled devices in a vicinity of URC 410.

After being successfully configured, URC 410 may control remote-controlled device 404. In one embodiment, URC 410 may use communication link 416 to directly control remote-controlled device 404. URC 410 may further be configured to respond to user input, such as activation of control element(s) 422, by sending commands (corresponding to certain programming codes) to remote-controlled device 404 via communication link 416. Sending commands to remote-controlled device 404 via communication link 416 may then cause remote-controlled device 404 to execute a function corresponding to the command.

Figure 5:
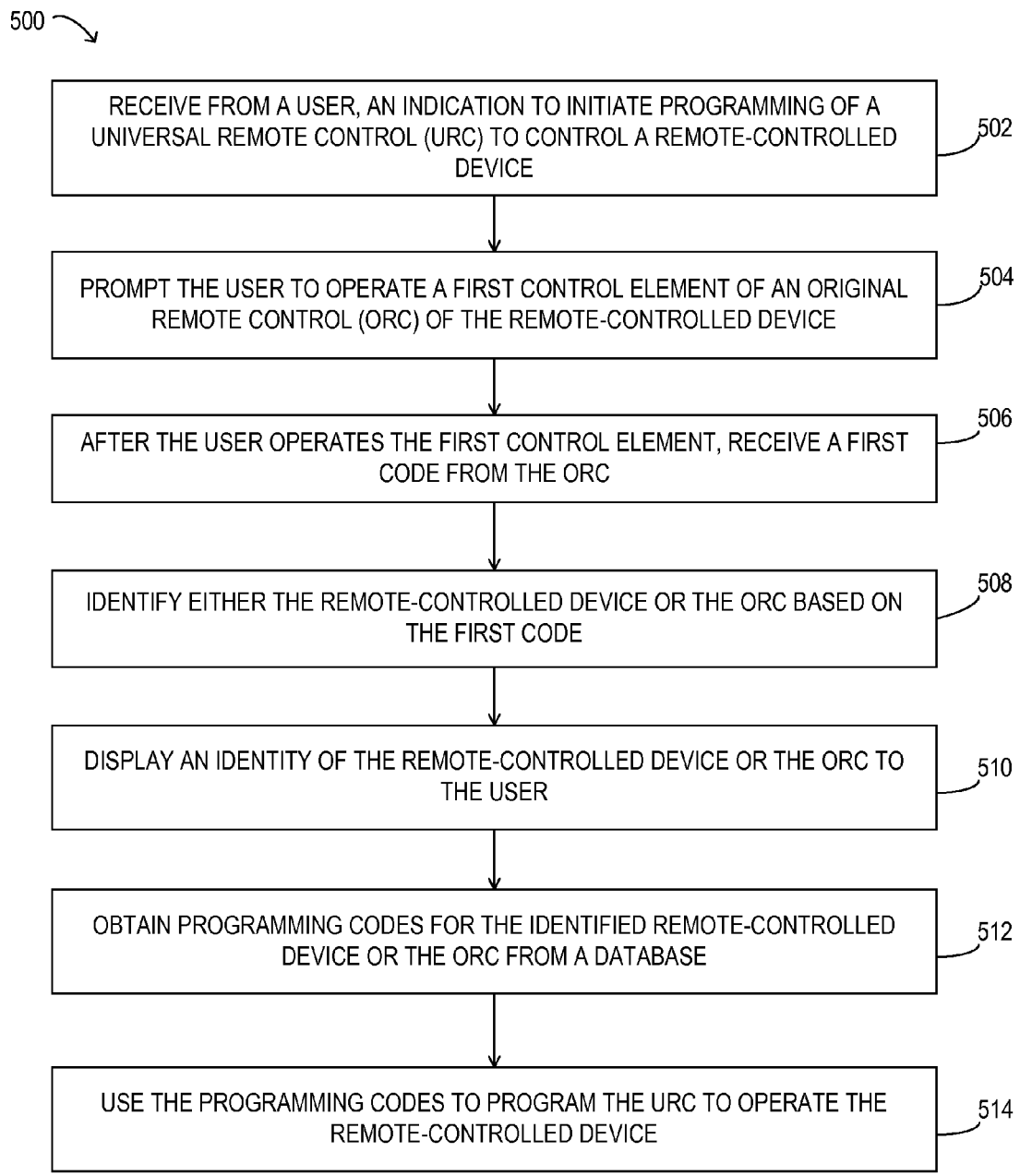
FIG. 5 illustrates an embodiment of a method for programming a universal remote control.

Turning now to FIG. 5, an embodiment of method 500 for programming a URC is illustrated. In one embodiment, method 500 is performed by URC programming 418 executing on URC 410. It is noted that certain operations described in method 500 may be optional or may be rearranged in different embodiments. In method 500, it is assumed that remote-controlled device 404 has been introduced in a vicinity of CPE 122 of MCDN client 120, and that URC 410 is capable of controlling remote-controlled device 404 and CPE 122 (see FIG. 4).

An indication to initiate programming of a URC to control a remote-controlled device may be received from a user (operation 502). The user may be prompted to operate a first control element of an ORC of the remote-controlled device (operation 504). After the user operates the first control element, a first code may be received from the ORC (operation 506). The user may be given feedback from the URC indicating when the URC is in communication with the ORC, and further indicating that a code corresponding to the first control element has been received. Based on the first code, the remote-controlled device or the ORC may be identified (operation 508). Operations to identify the remote-controlled device may include obtaining additional codes, in addition to the first code (see FIG. 6). The remote-controlled device may be uniquely identified based on one or more codes, including the first code.

Next, an identity of the remote-controlled device or the ORC may be displayed to the user (operation 510). Programming codes for the identified remote-controlled device or the ORC may be received from a database (operation 512). Programming codes, usable to program the URC, may be obtained in response to sending a request to a database. The request may include an identity of the remote-controlled device. The identity may be given by a model number, a device number, a part number, a serial number, a model name or description, other device information, or a combination thereof. The programming codes may be received from the database. The programming codes may then be used to program the URC to operate the remote control device (operation 514). At least some of the programming codes received from the database may be used to program the URC. In some embodiments, the URC is programmed with codes corresponding to respective programming codes for the remote-controlled device, such that the URC can generate commands associated with the programming codes.

Figure 6:
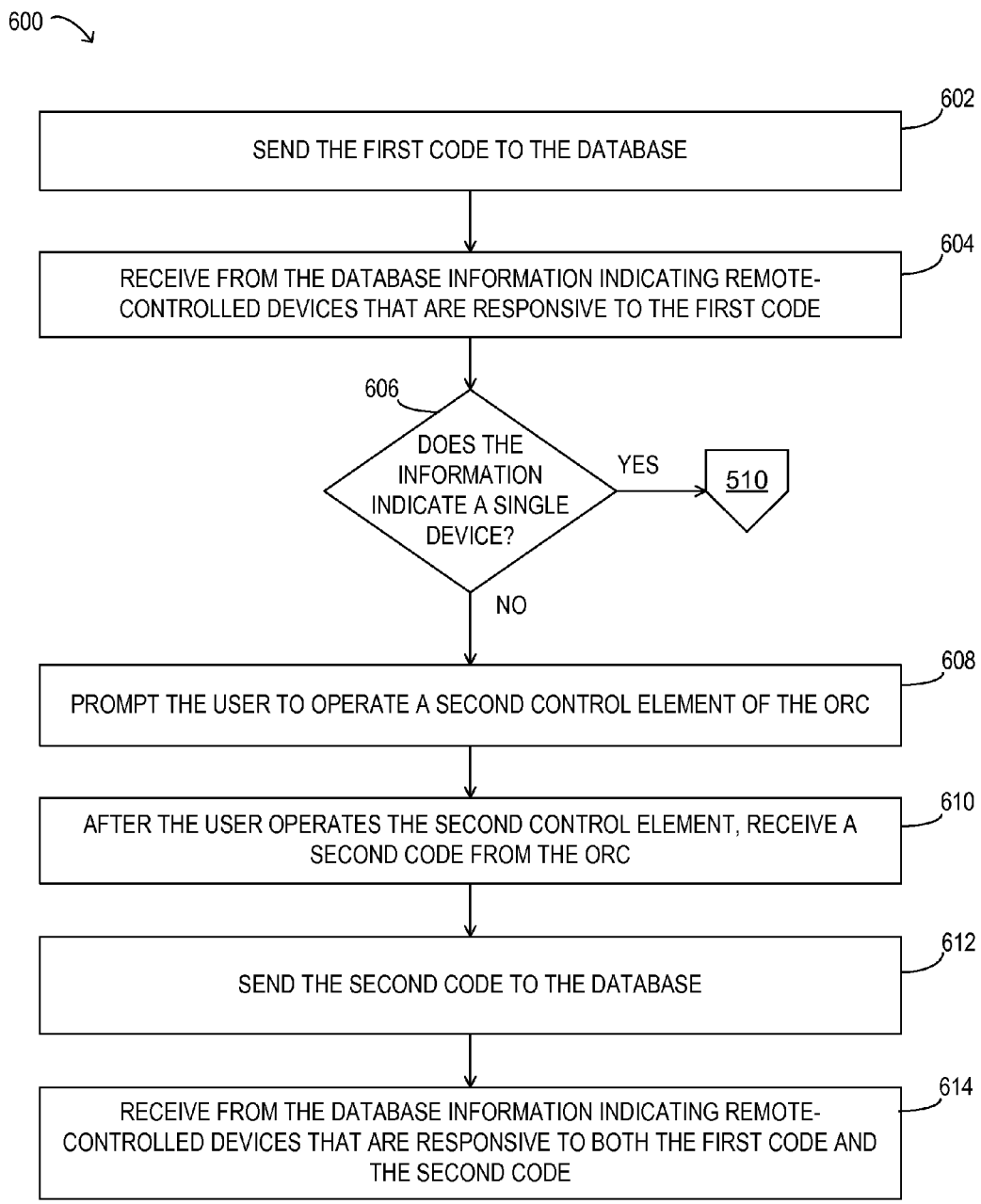
FIG. 6 illustrates an embodiment of a method for programming a universal remote control.

Turning now to FIG. 6, an embodiment of method 600 for programming a URC is illustrated. Method 600 may represent an embodiment of operation 508 in method 500, in which the remote-controlled device may be identified based on the first code (see FIG. 5).

The first code may be sent to the database (operation 602). The first code may be sent along with a request to identify the remote-controlled device. Information indicating remote-controlled devices that are responsive to the first code may be received from the database (operation 604). It is noted that devices responsive to the first code may include devices that are also responsive to additional codes. The information indicating which remote-controlled devices are responsive may therefore include at least one remote-controlled device. A decision may then be made, if the information indicates a single remote-controlled device (operation 606). If the result of operation 606 is YES, then method 600 may terminate and proceed with operation 510 in method 500 (see FIG. 5). If the result of operation 606 is NO, then the information has indicated more than one remote-controlled device may be responsive, and method 600 may proceed to prompt the user to operate a second control element of the ORC (operation 608).

After the user operates the second control element, a second code from the ORC may be received (operation 610). The second code may then be sent to the database (operation 612). Information indicating remote-controlled devices that are responsive to both the first code and the second code may be received from the database (operation 614). It is noted that identifying remote-controlled devices responsive to both the first code and the second code is included in identifying remote-controlled devices responsive to the first code. In certain cases, the information received in operation 614 may indicate a single or a small number of remote-controlled device(s). It is noted that method 600 may be repeated with successive control elements, as desired, until the remote-controlled device has been sufficiently narrowed down to a single device, or a small number of devices.

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A method for configuring a universal remote control, the method comprising:
receiving input from a user for initiating programming of the universal remote control;
after the user operates a first control element of an original remote control corresponding to a remote-controlled device, receiving, at the universal remote control, a first code directly from the original remote control;

identifying, as an identified device, one of the original remote control and the remote-controlled device based on the first code;

displaying an identity of the identified device to the user;

sending a request, indicating the identified device, for programming codes;

retrieving programming codes for the identified device; and configuring the universal remote control to operate the remote-controlled device by programming the universal remote control to use at least one of the programming codes.

2. The method of claim 1, wherein identifying the identified device includes:

receiving, from a database, information indicating a list of remote-controlled devices that are responsive to the first code.

3. The method of claim 2, wherein the remote-controlled device is uniquely identified with the list.

4. The method of claim 2, wherein the information received indicates more than one identified remote-control device, the method further comprising:

after the user operates a second control element of the original remote control, receiving a second code from the original remote control; and receiving, from the database, information indicating identified remote-controlled devices that are responsive to both the first code and the second code.

5. The method of claim 2, wherein retrieving the programming codes includes:

retrieving programming codes from the database.

6. The method of claim 1, further comprising:

receiving a confirmation from the user acknowledging the identity displayed.

7. The method of claim 1, further comprising:

displaying a prompt to the user to operate the first control element.

8. The method of claim 1, wherein the universal remote control is programmed using a wireless communication link.

9. The method of claim 1, wherein the universal remote control is configured to operate with client-premises equipment associated with a multimedia content distribution network.

10. The method of claim 1, further comprising:

sending a command to control the remote-controlled device, wherein the command is associated with one of the programming codes.

11. A universal remote control for use within a client configuration of a multimedia content distribution network, the universal remote control comprising:

a processor;

a remote control interface; and computer readable storage media accessible to the processor, including processor executable instructions that, when executed by the processor, cause the processor to perform operations comprising:

prompting a user to operate a first control element of an original remote control corresponding to a remote-controlled device;

after the user operates the first control element, receiving a first code directly from the original remote control at the remote control interface;

displaying an identity of one of the remote controlled device and the original remote control as the identified device to the user;

sending a request, indicating the identified device, for programming codes;

retrieving programming codes for the remote-controlled device; and programming the universal remote control to use at least one of the programming codes.

12. The universal remote control of claim 11, wherein the operations include:

initiating programming of the universal remote control in response to user input prior to said prompting.

13. The universal remote control of claim 11, wherein the operations include:

prompting the user to operate a second control element of the original remote control;

after the user operates the second control element, receiving a second code from the original remote control at the remote control interface; and in response to querying the database with the first code and the second code, retrieving programming codes for the remote-controlled device.

14. The universal remote control of claim 13, wherein prompting the user to operate the second control element occurs in response to receiving an indication of more than one remote-controlled device that corresponds to the first code.

15. The universal remote control of claim 11, wherein the operations include:

sending, via the remote control interface, a command to control the remote-controlled device, wherein the command is associated with at least one of the programming codes.

16. The universal remote control of claim 11, wherein the storage media further includes the database.

17. A non-transitory computer-readable storage medium, including processor executable instructions that, when executed by a processor, cause the processor to perform operations comprising:

transitioning the universal remote control to a programming state in response to user input;

in response to a user operating a first control element of an original remote control associated with a remote-controlled device, receiving, at the universal remote control, a first code directly from the original remote control;

identifying, as the identified device, one of the remote-controlled device and the original remote control using the first code;

displaying an identity of the remote controlled device or the original remote control to the user;

sending a request, indicating the identified device, for programming codes;

retrieving programming codes for at least one of the remote-controlled device and the original remote control from a database; and programming the universal remote control to operate the remote-controlled device using at least one of the programming codes.

18. The storage medium of claim 17, wherein the operations include:

sending, from the universal remote control, a command to control the remote-controlled device, wherein the command is associated with at least one of the programming codes.

19. The storage medium of claim 17, wherein the operations include:

responding to the user operating a second control element of the original remote control by receiving a second code from the original remote control;

sending a request to the database to identify the remote-controlled device, the request including the first code and the second code; and in response to sending the request, receiving an identity of the remote-controlled device or the original remote control.

\* \* \* \* \*